(12) United States Patent
Lee

(10) Patent No.: US 11,530,308 B2
(45) Date of Patent: Dec. 20, 2022

(54) METHOD OF MANUFACTURING MODIFIED LIQUID CRYSTAL POLYMER, LIQUID CRYSTAL POLYMER COMPOSITION AND METHOD FOR CHANGING MELTING POINT OF LIQUID CRYSTAL POLYMER

(71) Applicant: AZOTEK CO., LTD., Taoyuan (TW)

(72) Inventor: Hung-Jung Lee, Taoyuan (TW)

(73) Assignee: AZOTEK CO., LTD., Taoyuan (TW)

( * ) Notice: Subject to any disclaimer, the term of this patent is extended or adjusted under 35 U.S.C. 154(b) by 422 days.

(21) Appl. No.: 16/795,549

(22) Filed: Feb. 19, 2020

(65) Prior Publication Data

US 2020/0325293 A1 Oct. 15, 2020

Related U.S. Application Data

(60) Provisional application No. 62/832,896, filed on Apr. 12, 2019.

(30) Foreign Application Priority Data

Apr. 19, 2019 (TW) ................. 108113884

(51) Int. Cl.

| | | |
|---|---|---|
| *B29C 71/02* | (2006.01) | |
| *B29C 71/00* | (2006.01) | |
| *C09K 19/38* | (2006.01) | |
| *C09K 19/02* | (2006.01) | |
| *C08J 3/00* | (2006.01) | |
| *C08G 63/181* | (2006.01) | |
| *C08L 67/02* | (2006.01) | |
| *B29K 105/00* | (2006.01) | |

(52) U.S. Cl.
CPC ............ *C08J 7/08* (2013.01); *B29C 71/0072* (2013.01); *B29C 71/02* (2013.01); *C08G 63/181* (2013.01); *C08J 3/00* (2013.01); *C08L 67/02* (2013.01); *C09K 19/02* (2013.01); *C09K 19/3838* (2013.01); *B29K 2105/0079* (2013.01)

(58) Field of Classification Search
CPC ................ B29C 71/0072; B29C 71/02; B29K 2105/0079; C08G 63/181; C08J 7/08; C08J 3/00; C08L 67/02; C09K 19/02; C09K 19/3838
See application file for complete search history.

(56) References Cited

U.S. PATENT DOCUMENTS

2017/0238428 A1* 8/2017 Takahashi ............ H05K 3/4632
174/251

FOREIGN PATENT DOCUMENTS

| | | |
|---|---|---|
| CN | 1232860 A | 10/1999 |
| CN | 102482428 A | 5/2012 |
| CN | 107079594 A | 8/2017 |
| CN | 107107555 A | 8/2017 |
| JP | S49-040152 B | 10/1974 |
| JP | H6-055652 A | 3/1994 |
| JP | H11-291329 A | 10/1999 |
| JP | 2003-320592 A | 11/2003 |
| JP | 2010-000795 A | 1/2010 |
| JP | 2013-502482 A | 1/2013 |
| JP | 2017-538014 A | 12/2017 |
| KR | 1019930023753 A | 12/1993 |
| TW | 201628467 A | 8/2016 |
| TW | 201637535 A | 10/2016 |
| TW | I647261 B | 1/2019 |

* cited by examiner

*Primary Examiner* — Patrick D Niland
(74) *Attorney, Agent, or Firm* — CKC & Partners Co., LLC

(57) ABSTRACT

A method of manufacturing a modified liquid crystal polymer includes: providing a liquid crystal polymer having a first melting point; heating the liquid crystal polymer to a first temperature and maintaining at the first temperature for a first time period, in which the first temperature is lower than or equal to the first melting point; and cooling the liquid crystal polymer to a second temperature to form a first modified liquid crystal polymer, the second temperature being lower than the first temperature, the first modified liquid crystal polymer having a second melting point, in which the second melting point is higher than the first melting point.

10 Claims, 1 Drawing Sheet

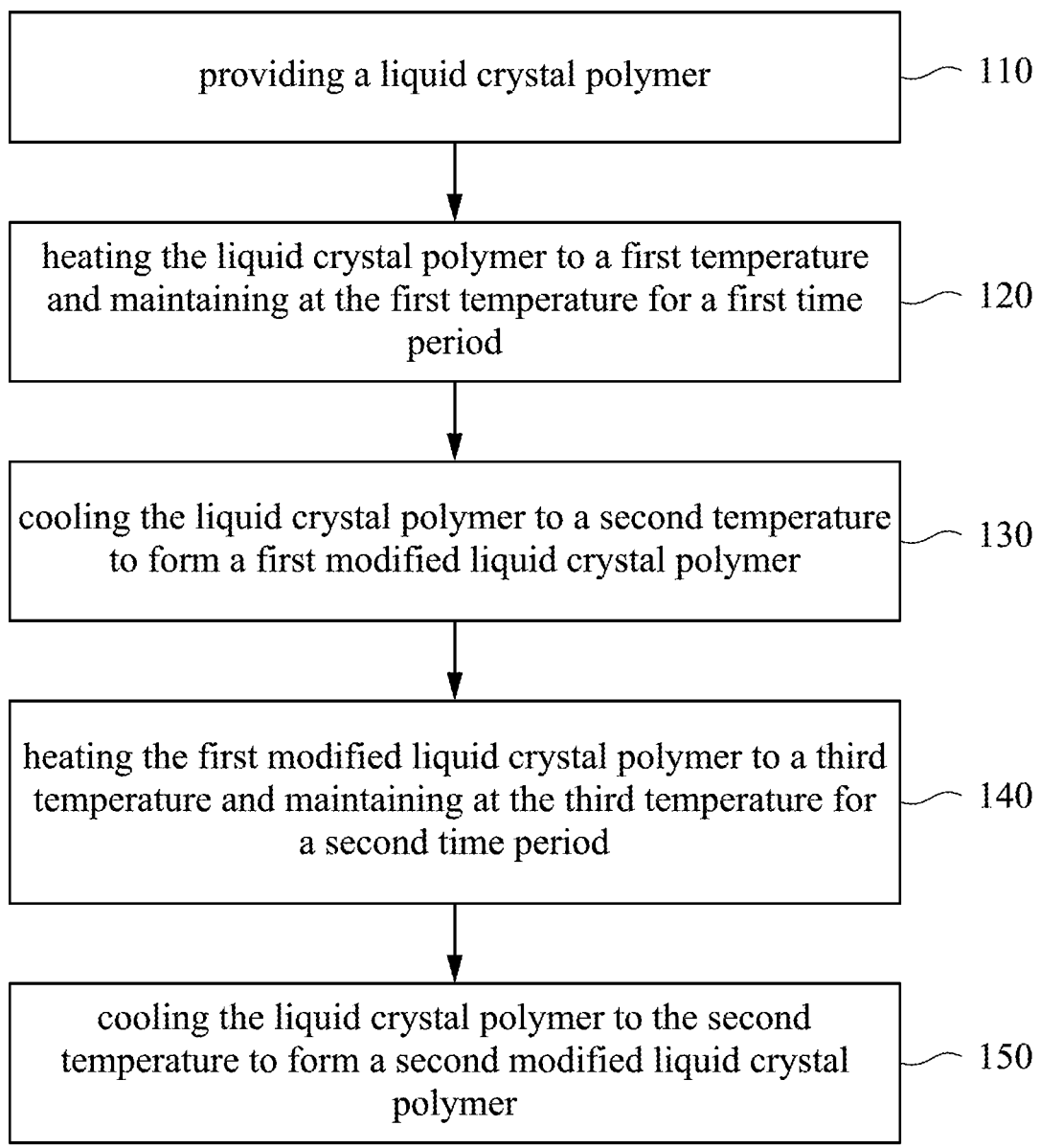

METHOD OF MANUFACTURING MODIFIED LIQUID CRYSTAL POLYMER, LIQUID CRYSTAL POLYMER COMPOSITION AND METHOD FOR CHANGING MELTING POINT OF LIQUID CRYSTAL POLYMER

CROSS-REFERENCE TO RELATED APPLICATION

This application claims priority to U.S. Provisional Application Ser. No. 62/832,896, filed Apr. 12, 2019, and Taiwan patent application Serial No. 108113884, filed Apr. 19, 2019 which are herein incorporated by reference.

BACKGROUND

Field of Invention

Embodiments of the present disclosure relate to a method of manufacturing a modified liquid crystal polymer, a liquid crystal polymer composition and a method for changing a melting point of the liquid crystal polymer.

Description of Related Art

Printed circuit boards are indispensable components in electronic products. As the demand for consumer electronics increases, so does the demand for printed circuit boards. However, laminated plates made of conventional liquid crystal polymers cannot endure the high-temperature laminating processes in the manufacture of circuit boards.

Further, the film of the liquid crystal polymer used in the laminated plate is fabricated by heating and fusing the particles of the liquid crystal polymer, followed by a molding process such as an extrusion molding process, inflation molding process and blow molding process. In the subsequent laminating process, the process temperature is close to the melting point of the liquid crystal polymer. The conventional liquid crystal polymer has a consistent melting point so that most of the liquid crystal polymer is melted during the laminating process, resulting in a considerable change in the thickness of the laminated plates. Therefore, it is difficult to accurately control the thickness of the produced laminated product. Accordingly, there is a need for a technical solution that can improve the above issues.

SUMMARY

One aspect of the present disclosure provides a method of manufacturing a modified crystal polymer. The method includes the steps of: providing a liquid crystal polymer having a first melting point; heating the liquid crystal polymer to a first temperature and maintaining at the first temperature for a first time period, in which the first temperature is lower than or equal to the first melting point; and cooling the liquid crystal polymer from the first temperature to a second temperature to form a first modified liquid crystal polymer, the second temperature being lower than the first temperature, the first modified liquid crystal polymer having a second melting point, in which the second melting point is higher than the first melting point.

According to one or more embodiments of the present disclosure, a difference between the first temperature and the first melting point is lower than or equal to 100° C.

According to one or more embodiments of the present disclosure, the liquid crystal polymer is heated to the first temperature with a rate in a range of from 0.1 to 10° C./min.

According to one or more embodiments of the present disclosure, the first time period is in a range of from 0.5 to 6 hours.

According to one or more embodiments of the present disclosure, the liquid crystal polymer is cooled to the second temperature with a rate in a range of from 0.1 to 10° C./min.

According to one or more embodiments of the present disclosure, the second temperature is higher than or equal to ambient temperature.

According to one or more embodiments of the present disclosure, the method further includes: heating the first modified liquid crystal polymer to a third temperature and maintaining at the third temperature for a second time period, in which the third temperature is higher than the first temperature; and cooling the first modified liquid crystal polymer from the third temperature to the second temperature to form a second modified liquid crystal polymer, the second modified liquid crystal polymer having a third melting point, in which the third melting point is higher than the second melting point.

According to one or more embodiments of the present disclosure, a difference between the third temperature and the first temperature is in a range of from 20 to 50° C.

According to one or more embodiments of the present disclosure, the second time period is in a range of from 0.5 to 6 hours.

Another aspect of the present disclosure provides a liquid crystal polymer composition manufactured by the above method.

Another aspect of the present disclosure provides a method for changing a melting point of a liquid crystal polymer, which includes: providing a liquid crystal polymer having a first melting point; heating the liquid crystal polymer to a first temperature and maintaining at the first temperature for 0.5-6 hours, in which the first temperature is lower than or equal to the first melting point; and cooling the liquid crystal polymer from the first temperature to a second temperature, so that the liquid crystal polymer has a second melting point higher than the first melting point, the second melting point being higher than the first melting point, in which the second temperature is lower than the first temperature.

BRIEF DESCRIPTION OF THE DRAWINGS

In order to make the above and other objects, features, advantages and embodiments can be more fully understood, detailed description of the accompanying drawings as follows:

FIG. 1 is a flow chart showing a method 100 of manufacturing a modified liquid crystal polymer according to some embodiments of the present disclosure.

DETAILED DESCRIPTION

In order to make the description of the present disclosure more detailed and complete, reference is made to the accompanying drawings and the various embodiments or examples described below.

The singular term used herein includes plural referents unless the context clearly dictates otherwise. By reference to a specific reference to "an embodiment", at least one of embodiments of the present disclosure shows a particular feature, structure or characteristic, such that when the specific reference "in one embodiment" is made, it is not necessary to refer to the same embodiment, and further, in one or more embodiments, these particular features, structures, or characteristics may be combined with each other as appropriate.

The present disclosure provides a method of manufacturing a modified liquid crystal polymer. Please refer to FIG. 1, which is a flow chart showing a method 100 of manufacturing a modified liquid crystal polymer according to some embodiments of the present disclosure.

In step 110, a liquid crystal polymer is provided. In some embodiments, the liquid crystal polymer has a first melting point. Since the liquid crystal polymer has a structure of linear polymers that are densely arranged, the formed product has good mechanical properties. The liquid crystal polymer may further possess good strength or excellent heat resistance after being treated with an alignment process, and therefore is suitable for heat-resistant materials in electronics and is also suitable for the substrates of high-performance engineering plastic. In some embodiments, the first melting point may be in a range of from 200° C. to 400° C., such as 250° C., 270° C., 280° C., 290° C., 300° C., or 350° C.

Since the molecules of liquid crystal polymer are easily aligned to form a molecular-level barrier, the characteristics of low absorption of water and high gas barrier property are outstanding. The film formed from the liquid crystal polymer exhibits lower water absorption, lower dielectric constant, lower coefficient of thermal expansion (CTE), better dimensional stability, better gas barrier property and better thermal conductivity than those of a conventional polyimide (PI) material. In particular, the coefficient of linear thermal expansion along the flow direction (in the molding process of the liquid crystal polymer) is extremely low, and is one order of magnitude lower than that of ordinary plastics, and is similar to the coefficient of thermal expansion of metal. The liquid crystal polymer has a material property that can be recycled and reused, and can be directly bonded to a metal layer without using an adhesive (e.g., epoxy resin). Therefore, the liquid crystal polymer is cost-effective.

In some embodiments, the liquid crystal polymer may be in the form of powder. In some embodiments, the liquid crystal polymer may be ground into powder by a grinding process, but not limited thereto. In certain embodiments, an average particle size of the powder may be ranged from 1 nm to 1000 μm, for example 5 nm, 10 nm, 15 nm, 20 nm, 30 nm, 50 nm, 70 nm, 90 nm, 100 nm, 1 μm, 5 μm, 10 μm, 15 μm, 20 μm, 50 μm, 100 μm, 200 μm, 300 μm, 400 μm, 500 μm, 600 μm, 700 μm, 800 μm and 900 μm.

In other embodiments, the liquid crystal polymer may be a thermotropic liquid crystal polymer resin, and the thermotropic liquid crystal polymer resin can be classified into either a liquid crystal polymer or a liquid crystal oligomer resin according to the molecular weight. In some embodiments, the liquid crystal polymer resin and/or the liquid crystal oligomer resin may be ground to form the liquid crystal polymer powder.

The thermotropic liquid crystal polymer resin includes three types as follows: (1) the first-typed liquid crystal polymer resin is the high heat-resistant type, and the transition temperature of the liquid crystal is higher than about 330° C. The first-typed liquid crystal polymer resin has high tensile strength and elastic modulus, and exhibits good resistance to chemical corrosion, and is suitable for applications of high temperature processes, but its processing performance is slightly poor. (2) The second-typed liquid crystal polymer resin is the medium heat-resistant type, and the transition temperature of the liquid crystal ranges from about 280° C. to about 320° C. The second-typed liquid crystal polymer resin exhibits hydrolytic stability and resistance to chemical corrosion, and further has excellent electrical property, flame retardancy, and impervious property. Accordingly, the medium heat-resistant type is advantageous in better comprehensive properties. (3) The third-typed liquid crystal polymer resin is the low heat-resistant type, and the transition temperature of the liquid crystal is lower than about 240° C. The third-typed liquid crystal polymer resin has slightly poor heat resistance, but has good processability and cheap price.

In one embodiment, the high heat-resistant type of liquid crystal polymer resin includes a liquid crystal polymer comprised of p-hydroxybenzoic acid (HBA), terephthalic acid (TA), and 4,4'-dioxydiphenol (DODP). For example, commercial liquid crystal polymer resin, named Xydar®, has a repeating unit structure as follows:

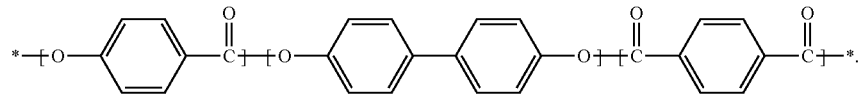

In another embodiment, the medium heat-resistant type of liquid crystal polymer resin includes a liquid crystal polymer comprised of p-hydroxybenzoic acid (HBA) and 6-hydroxy-2-naphthoic acid (HNA). For example, commercial liquid crystal polymer resin, named Vectra®, has a repeating unit structure as follows:

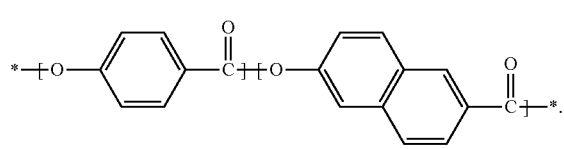

In another embodiment, the low heat-resistant type of liquid crystal polymer resin includes a liquid crystal polymer comprised of polyethylene terephthalate (PET) and p-hydroxybenzoic acid (HBA). For example, commercial liquid crystal polymer resin, named $X_7G$®, has a repeating unit structure as follows:

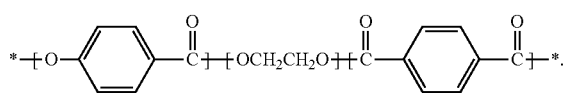

Further, in the present disclosure, the liquid crystal polymer may be a soluble liquid crystal polymer. In some embodiments, the soluble liquid crystal polymer includes the liquid crystal polymer and an aromatic polymer described below. The aromatic polymer is one or more selected from the group consisting of aromatic polyester, aromatic polyamide, polyphenylene terephthalamide (PPTA), and poly(p-phenylene-2,6-benzobisoxazole) (PBO)

and a copolymer of p-hydroxybenzoic acid and 2-hydroxy-6-naphthoic acid (i.e., poly(p-hydroxybenzoic acid-co-2-hydroxy-6-naphthoic acid)).

In some embodiments, the soluble liquid crystal polymer has a repeating unit which has a structure shown below:

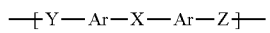

in which Ar may be 1,4-phenylene, 1,3-phenylene, 2,6-naphthalene or 4,4'-biphenylene, and Y may be O or NH, and Z is C═O, and X may be amino, carboxamido, imido (or imino), amidino, aminocarbonylamino, aminothiocarbonyl, aminocarbonyloxy, aminosulfonyl, aminosulfonyloxy, aminosulfonylamino, carboxyl ester, (carboxyl ester) amino, (alkoxycarbonyl)oxy, alkoxycarbonyl, hydroxyamino, alkoxyamino, cyanato, isocyanato or a combination thereof, but is not limited thereto.

In step 120, the liquid crystal polymer is heated to a first temperature and maintained at the first temperature for a first time period. The first temperature is lower than or equal to the first melting point of the liquid crystal polymer. In some embodiments, the difference between the first temperature and the first melting point is less than or equal to 100° C., such as 80° C., 60° C., 40° C., or 20° C.

In some embodiments, the liquid crystal polymer is heated to the first temperature with a rate ranged from 0.1 to 10° C./min, such as 0.5° C./min, 1° C./min, 2° C./min, 5° C./min, 8° C./min, 9° C./min or 9.5° C./min. If the heating rate is too slow, for example, less than 0.1° C./min, the overall required process time is too long, and the cost of the process is unfavorably increased. If the heating rate is too fast, for example, more than 10° C./min, the liquid crystal polymer is unevenly heated, and the structure or morphology of the liquid crystal polymer does not be changed or modified in an expected or desired approach.

In certain embodiments, the first time period is in a range of from 0.5 to 6 hours, such as 1 hour, 2 hours, 3 hours, 4 hours, or 5 hours.

In step 130, the liquid crystal polymer is cooled to a second temperature to form a first modified liquid crystal polymer, in which the second temperature is lower than the first temperature. The first modified liquid crystal polymer has a second melting point, and the second melting point is higher than the first melting point of the original liquid crystal polymer.

In some embodiments, the second temperature is higher than or equal to ambient temperature. In examples, the second temperature may be 30° C., 40° C., 50° C., or 60° C. In some embodiments, the second temperature is lower than 100° C.

The first modified liquid crystal polymer has a higher melting point than that of the original liquid crystal polymer due to the Implementation of steps 120 and 130. When the liquid crystal polymer is heated to the first temperature, the structure and/or morphology thereof are partially reorganized. Accordingly, when the liquid crystal polymer is cooled to the second temperature, the size, shape and arrangement of molecules of the liquid crystal polymer are changed, leading to the change in the melting point of the liquid crystal polymer.

It is noted that the morphology of only partial liquid crystal polymer is reorganized or rearranged according to some embodiments. Therefore, after the treatments mentioned above are carried put, a new morphology(or composition) of the liquid crystal polymer is formed. The new morphology of the obtained liquid crystal polymer includes that of the original liquid crystal polymer and the first modified liquid crystal polymer. The formed liquid crystal polymer with the new morphology has a range of the melting point that is wider than that of the original liquid crystal polymer. For example, the melting point of the original liquid crystal polymer is 280° C., and the melting point of the liquid crystal polymers treated by the above steps is ranged from 280° C. to 300° C.

In some embodiments, the liquid crystal polymer is cooled to a second temperature with a rate in a range of from 0.1 to 10° C./min, such as 0.5° C./min, 1° C./min, 2° C./min, 5° C./min, 8° C./min, 9° C./min or 9.5° C./min. If the cooling rate is too slow, for example, lower than 0.1° C./min, the overall required process time is too long, and the cost of the process is unfavorably increased. If the cooling rate is too fast, for example, more than 10° C./min, the liquid crystal polymer is unevenly cooled and the structure or morphology of the liquid crystal polymer does not be changed or modified in the desired approach. Further, in some embodiments, step 140 continues after step 130. In step 140, the first modified liquid crystal polymer is heated to a third temperature and maintained at the third temperature for a second time period. The third temperature is higher than the first temperature described above. The difference between the third temperature and the first temperature may be in a range of from 20° C. to 50° C., such as 30° C. or 40° C. In some embodiments, the first temperature is approximately 250° C., and the third temperature is approximately 270° C. In certain embodiments, the second time period may be in a range of from 0.5 to 6 hours, such as 1 hour, 2 hours, 3 hours, 4 hours, or 5 hours. The second time period may be the same or different from the first time period.

In step 150, the first modified liquid crystal polymer is cooled to the second temperature to form a second modified liquid crystal polymer. The second modified liquid crystal polymer has a third melting point that is higher than the second melting point of the first modified liquid crystal polymer. In some embodiments, only a portion of the liquid crystal polymer is structurally or morphologically reorganized. Therefore, as described above, after the treatments described above are carried out, a new morphology of the liquid crystal polymer is formed, and the liquid crystal polymer with the new morphology has a range of the melting point that is wider than that of the previous one. For example, the melting point of the original liquid crystal polymer is 280° C., and the melting point of the liquid crystal polymer treated by the steps 120 and 130 is ranged between 280° C. and 300° C., and the melting point of the liquid crystal polymer treated by the steps 120, 130, 140 and 150 is ranged from 280° C. to 320° C.

In some embodiments, the steps 140-150 may be repeated a plurality of times. For example, the liquid crystal polymer is heated for a period of time (e.g., the step 140), and then is cooled (e.g., the step 150) to form the liquid crystal polymer with a different morphology. It is noted that the temperature to which the liquid crystal polymer is heated is 20-50° C. higher than the temperature of the previous heating step. The more the repetition is, the wider the range of the melting point of the obtained liquid crystal polymer. In some embodiments, the steps 140-150 may be repeated one to ten times in order to achieve a desired range of the melting point for the liquid crystal polymer. For example, the liquid crystal polymer can be firstly heated to 250° C., then cooled to 60° C., then heated to 270° C., then cooled to 60° C., subsequently heated to 290° C., and finally cooled to 60° C.

The present disclosure also provides a liquid crystal polymer which is manufactured by the manufacturing method described above.

The present disclosure also provides a method for changing a melting point of a liquid crystal polymer. The method includes the steps of: providing a liquid crystal polymer having a first melting point; heating the liquid crystal polymer to a first temperature and maintaining at the first temperature for 0.5-6 hours, in which the first temperature is lower than or equal to the first melting point; and cooling the liquid crystal polymer from the first temperature to a second temperature, so that the liquid crystal polymer has a second melting point higher than the first melting point, the second melting point being higher than the first melting point, in which the second temperature is lower than the first temperature.

The liquid crystal polymer after the above treatments may have a wider range of the melting point. Specifically, the liquid crystal polymer may have a plurality of melting points which are distributed within the above melting point range.

The range of the melting point of the liquid crystal polymer of the present disclosure may be adjusted as needed. The liquid crystal polymer of the present disclosure has a progressive melting point, and can withstand a higher process temperature in the subsequent processes of forming the laminated board. For example, in the subsequent lamination process, the process temperature may be close the melting point, and most of the liquid crystal polymer is melted during the process because conventional liquid crystal polymers used for the laminate almost has a unique melting point. As a result, the thickness of the laminated layer may be changed from 50 μm to approximately 25 μm. The liquid crystal polymer disclosed in the present invention has a wider range of the melting point (i.e., the liquid crystal polymer has a higher melting point). During the subsequent bonding or laminating process, even though the process temperature may close to the melting point, only a portion of the liquid crystal polymer is melted since the liquid crystal polymer possesses a higher melting point. Accordingly, the thickness of the laminated layer may be changed from 50 μm (before the laminating process) to about 45 μm (after the laminating process). In view of the above, the liquid crystal polymer disclosed in the present disclosure is advantageous in accurately managing the thickness of the laminated layer, and therefore the errors of processes are relatively smaller and the design of the process window is enlarged.

The present disclosure has described certain embodiments in detail, but other embodiments are also possible. Therefore, the spirit and scope of the appended claims should not be limited to the embodiments described herein.

Although the disclosure has been disclosed in the above embodiments, it is not intended to limit the disclosure, and it may be altered or modified without departing from the spirit and scope of the disclosure. The scope of protection of the present disclosure is subject to the definition of the scope of appended claims.

What is claimed is:

1. A method of manufacturing a modified crystal polymer, comprising:
   providing a liquid crystal polymer having a first melting point;
   heating the liquid crystal polymer to a first temperature and maintaining at the first temperature for a first time period, wherein the first temperature is lower than or equal to the first melting point; and
   cooling the liquid crystal polymer from the first temperature to a second temperature that is lower than 100° C. with a rate ranged from 0.1 to 10° C/min to form a first modified liquid crystal polymer, wherein the second temperature is lower than the first temperature, and the first modified liquid crystal polymer has a melting point range comprising a second melting point that is greater than the first melting point.

2. The method of claim 1, wherein a difference between the first temperature and the first melting point is less than or equal to 100° C.

3. The method of claim 1, wherein the liquid crystal polymer is heated to the first temperature with a rate ranged from 0.1 to 10° C/min.

4. The method of claim 1, wherein the first time period ranges from 0.5 to 6 hours.

5. The method of claim 1, wherein the second temperature is greater than or equal to ambient temperature.

6. The method of claim 1, further comprising:
   heating the first modified liquid crystal polymer to a third temperature and maintaining at the third temperature for a second time period, wherein the third temperature is greater than the first temperature; and
   cooling the first modified liquid crystal polymer from the third temperature to the second temperature to form a second modified liquid crystal polymer, the second modified liquid crystal polymer having a third melting point that is greater than the second melting point.

7. The method of claim 6, wherein a difference between the third temperature and the first temperature ranges from 20 to 50° C.

8. The method of claim 6, wherein the second time period ranges from 0.5 to 6 hours.

9. A liquid crystal polymer composition manufactured by the method of claim 1, wherein the liquid crystal polymer composition comprises the first modified liquid crystal polymer.

10. A method for changing a melting point of a liquid crystal polymer, comprising:
    providing a liquid crystal polymer having a first melting point;
    heating the liquid crystal polymer to a first temperature and maintaining at the first temperature for 0.5-6 hours, wherein the first temperature is less than or equal to the first melting point; and
    cooling the liquid crystal polymer from the first temperature to a second temperature that is lower than 100° C. with a rate ranged from 0.1 to 10° C/min, so that the liquid crystal polymer has a melting point range comprising a second melting point greater than the first melting point, wherein the second temperature is lower than the first temperature.

* * * * *